United States Patent [19]

Fontaine

[11] Patent Number: 4,877,072
[45] Date of Patent: Oct. 31, 1989

[54] TREAD FOR LEFT AND RIGHT VEHICLE TIRES

[75] Inventor: Jean F. L. Fontaine, Bürden, Belgium

[73] Assignee: The Goodyear Tire & Rubber Company, Akron, Ohio

[21] Appl. No.: 134,333

[22] Filed: Dec. 17, 1987

[51] Int. Cl.$^4$ .............................................. B60C 11/11
[52] U.S. Cl. ............................ 152/209 R; 152/209 A
[58] Field of Search .......... 152/209 A, 209 R, 209 D, 152/209 B

[56] References Cited

U.S. PATENT DOCUMENTS

| 2,094,636 | 10/1937 | Bull | 152/209 R |
|---|---|---|---|
| 2,104,532 | 1/1938 | Sommer | 152/209 R |
| 2,154,290 | 4/1939 | Snyder | 152/209 R |
| 3,578,054 | 5/1971 | Boileau | 152/523 |
| 3,674,077 | 7/1972 | Verdier . | |
| 4,649,476 | 3/1987 | Cherveny et al. | 152/209 R |
| 4,693,290 | 9/1987 | Curtiss et al. | 152/454 |
| 4,730,654 | 3/1988 | Yamashita et al. | 152/209 A |
| 4,732,194 | 3/1988 | Saneto et al. | 152/209 R |

FOREIGN PATENT DOCUMENTS

| 147223 | 10/1976 | Austria . |
|---|---|---|
| 0066531 | 8/1982 | European Pat. Off. . |
| 0227575 | 7/1987 | European Pat. Off. . |
| 1480962 | 6/1969 | Fed. Rep. of Germany . |
| 2035714 | 2/1971 | Fed. Rep. of Germany . |
| 2322095 | 11/1974 | Fed. Rep. of Germany . |
| 2536470 | 2/1977 | Fed. Rep. of Germany . |
| 3701909 | 7/1987 | Fed. Rep. of Germany . |
| 794233 | 2/1936 | France . |
| 2053873 | 4/1971 | France . |
| 2157211 | 5/1973 | France . |
| 2235811 | 1/1975 | France . |
| 0489359 | 4/1938 | United Kingdom . |
| 1317785 | 5/1973 | United Kingdom . |
| 1481313 | 7/1977 | United Kingdom . |
| 1492559 | 11/1977 | United Kingdom . |
| 1514473 | 6/1978 | United Kingdom . |
| 1554281 | 10/1979 | United Kingdom . |
| 2093777 | 9/1982 | United Kingdom . |

OTHER PUBLICATIONS

*Strength of Materials,* Part I, S. Timoshenko, Published by Van Nostrand Reinhold Co., 1958, pp. 416–429.

Primary Examiner—Michael W. Ball
Assistant Examiner—Geoffrey L. Knable
Attorney, Agent, or Firm—L. R. Drayer

[57] ABSTRACT

The invention relates to a set of tires for mounting on a vehicle which has at least two driven wheels and at least two steering wheels. The set of tires is characterized in that it comprises tires which have different tread designs for use on the left hand side and right hand side steering wheels. The different tread designs of the set of tires comprise a plurality of elongated relief element (6) which extend across the tread width (TW) with the direction of the major axis (8) of their central ellipse of inertia (7) making an angle $\alpha, \beta$ with the mid-circumferential plane M—M of the tires. The present invention provides an optimum cornering stability for both left hand side and right hand side cornering for a vehicle being equipped with a set of tires according to the invention.

6 Claims, 3 Drawing Sheets

TREAD FOR LEFT AND RIGHT VEHICLE TIRES

The invention relates to sets of tires for vehicles having at least two driven wheels and at least two steering wheels, each wheel being provided with a pneumatic tire, the tires intended for use on the left and right hand steering wheels being different from one another.

Such a set of tires is for example shown in FR-A-2 157 211. In this prior art publication the tires which are mounted on the left hand side wheels of the vehicle are different from the tires which are mounted on the right hand side wheels of the vehicle. The object of this earlier invention is to improve the self cleaning of farm tires, i.e. of tires that are used on agricultural vehicles that generally operate in loose ground.

In contrast to this prior art publication, the set of tires of the present invention is intended to be used on high performance passenger vehicles, in order to improve the cornering stability of these vehicles. By high performance passenger vehicles are meant vehicles which are capable of exceeding speeds of 190 km/h.

It is well known that the tire on the outside steering wheel of a cornering vehicle, i.e. the steering wheel on the side of the vehicle furthest away from the center of curvature of the trajectory of the cornering vehicle, counteracts the major part of the cornering force as the load of the vehicle is primarily transferred to this wheel. There is provided by the invention a set of tires providing an optimum cornering stability for both right hand side and left hand side cornering which is obtained if the resultant cornering force, which is always directed towards the inside of the vehicle on which the tires are mounted, is counteracted by substantially all relief elements of the ground engaging tread portion of the outside steering wheel, i.e. if the relief elements of the tire on the outside steering wheel are arranged in such a way that they all provide their highest stiffness in a direction which is substantially parallel to the direction of the resultant cornering force. This can be accomplished by mounting tires of different tread designs on the left hand side steering wheel and right hand side steering wheel. The tire which is mounted on the left hand side steering wheel of the vehicle may have a ground engaging tread portion comprising elongated relief elements which are all arranged such that the direction of the major axis of its central ellipse of inertia makes an angle with the mid-circumferential plane of the tire and is oriented in the direction of the central portion of the letter "Z". The tire which is mounted on the right hand side steering wheel of the vehicle may have a ground engaging tread portion comprising elongated relief elements which are all arranged such that the direction of the major axis of their ellipse of inertia makes an angle with the mid-circumferential plane of the tire and is oriented in the direction of the central portion of the letter "S". The orientation of the elongated relief elements in terms of the letters "S" and "Z" refer to the orientation of the elements as seen by an observer of the tire, looking towards the axis of rotation of the tire.

In the art of material science, the central ellipse of inertia of an element is a means for characterizing the stiffness of that element in a particular plane. In the tire art, the stiffness of interest is the resistance that the relief elements oppose to the tangential forces applied to the relief elements. The stiffness of a relief element of a tire tread is generally measured by the deflection of the relief element under such tangential forces, the deflection in a particular direction being inversely proportional to the moment of inertia of the relief element in that direction. Further details concerning the determination of the central ellipse of inertia of an element can for example be found in "Strength of Materials" by S. Timoshenko, published by Van Nostrand Reinhold Company, New York, in 1958. Particularly of interest are pages 417 up to and including 428.

It is preferred that all measurements relating to tires in the following description and claims of the invention be expressed in terms of measurements that are made on the footprints of the tires, i.e., on the imprint that a tire makes on the ground when it is mounted on a specified rim, inflated at a design pressure and subjected to a rated load for said design pressure.

It follows that, since the footprint of a tire provides an image of the ground engaging tread portion of a tire which is the reversed image of that seen by an observer of an actual tire, the tire which is mounted on the left hand side steering wheel of the vehicle shows an "S"-type orientation of the major axis of the central ellipse of inertia of the elongated relief elements in the footprint, while the tire which is mounted on the right hand side steering wheel of the vehicle shows a "Z"-type orientation of the major axis of the central ellipse of inertia of the elongated relief elements in the footprint.

It is further preferred that the direction of the major axis of the central ellipse of inertia of each relief element be defined in a system of Cartesian axes, the center of the Cartesian axes of each relief element being located at its center of gravity, the x-axis being the axial direction of the tire and the y-axis being the circumferential direction of the tire.

Throughout the specification the terms "axial" and "axially" relate to displacements along the axis of rotation of the tire, and the terms "radial" and "radially" refer to displacements perpendicular to the axis of rotation of the tire.

According to the present invention the set of tires for mounting on a vehicle is characterized in that the tires for mounting on the left hand side steering wheels each have a ground engaging tread portion comprising a plurality of elongated relief elements having central ellipses of inertia with the direction of their major axis being located in the second and fourth quadrant of their Cartesian axes and making an angle $\alpha$ in the range of 45° to 80° with the mid-circumferential plane of the tire, the sum of the ground engaging surfaces of the elongated relief elements in the footprint of the tires being greater than half the total ground engaging surface of the tires and the tires for mounting on the right hand side steering wheel each have a ground engaging tread portion comprising a plurality of elongated relief elements having central ellipses of inertia with the direction of their major axis being located in the first and third quadrant of their Cartesian axes and making an angle $\beta$ in the range of 45° of 80° with the mid-circumferential plane of the tires, the sum of the ground engaging surfaces of the elongated relief elements in the footprint of the tires being greater than half the total ground engaging surface of the tires, the left hand side and right hand side of the vehicle being defined in relation to its forward direction and the center of the Cartesian axes of each relief element being located in its center of gravity.

The mid-circumferential plane M—M of the tire is a plane normal to the axis of rotation and which is located midway between the lateral edges of the tire footprint.

The invention will now be described with reference to the accompanying drawings, in which.

Figure 1:
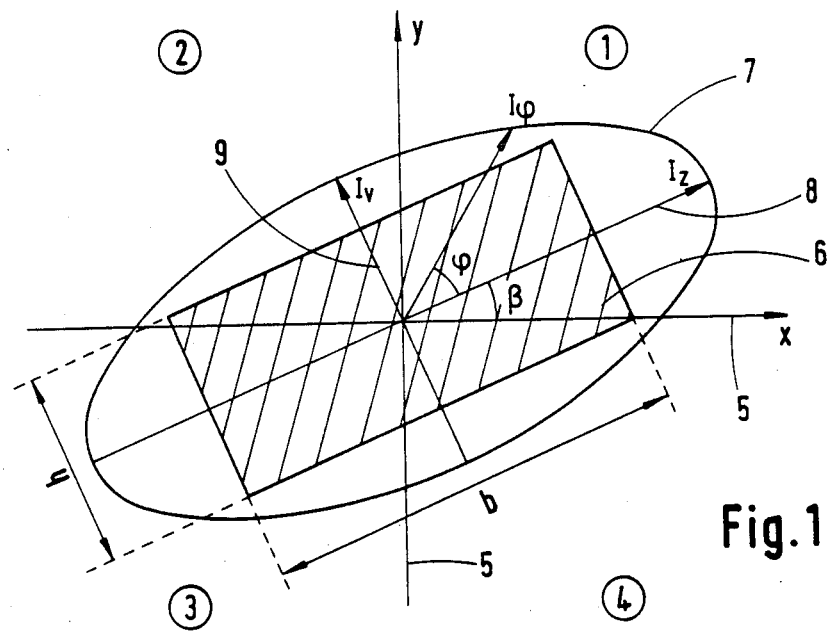
FIG. 1 is a view of the ground engaging surface of an elongated relief element of a tire which can be used on the steering wheels of a vehicle of the present invention.

Referring now to FIG. 1, there is illustrated an example of an elongated relief element 6 of a tire tread with the central ellipse of inertia of its ground engaging surface. The ground engaging surface of the relief element 6 has a rectangular cross section with side lengths h and b. The moments of inertia ($I_z$, $I_v$) of the relief element 6, which form the principal axes 8,9 of the central ellipse of inertia 7, pass through the center of gravity of the element and are parallel to its sides.

The moment of inertia $I_\phi$ relative to an axis forming an angle $\phi$ with the major axis 8 is defined by the following formula:

$$I_\phi = I_z \cos^2\phi + I_v \sin^2\phi \quad \text{(A)}$$

For a rectangular element as shown in FIG. 1, the following equations for $I_z$ and $I_v$ apply:

$$I_z = \frac{bh^3}{12} \text{ and } I_v = \frac{hb^3}{12}, \text{ so equation (A) becomes:} \quad \text{(B)}$$

$$I_\phi = \frac{bh^3}{12}\cos^2\phi + \frac{hb^3}{12}\sin^2\phi$$

in which:
$I_z$ = main inertia moment relative to the z-axis
$I_v$ = main inertia moment relative to the v-axis
$I_\phi$ = moment of inertia of a plane section which makes an angle $\phi$ with one of the main axes.
b = side length of rectangular sectioned element
h = side length of rectangular sectioned element.

Equation (B) defines the central ellipse of inertia 7 of the ground engaging surface of the relief element 6, as shown in FIG. 1. In the example shown side length b is equal to 2 times the side length h. Equation (B) for b=2h reduces to:

$$I_\phi = \frac{4}{6} h^4\cos^2\phi + \frac{1}{6} h^4\sin^2\phi \quad \text{(C)}$$

Since the stiffness in a particular direction of a relief element 6 is proportional to its moment of inertia, equation (C) shows that the stiffness measured parallel to the major axis 8 ($\phi=0°$) is four times greater than the stiffness measured parallel to the minor axis 9 ($\phi=90°$).

FIG. 1 further illustrates the Cartesian axes 5 positioned in the element 6 and consisting of an x-axis and an y-axis and the four associated quadrants respectively first, second, third and fourth quadrant, labelled in FIG. 1 as 1,2,3 and 4, which are used throughout this specification as a reference set of axes for defining the orientation of the central ellipses of inertia the x-axis being the axial direction of the tire and the y-axis being the circumferential direction of the tire.

Figure 2:
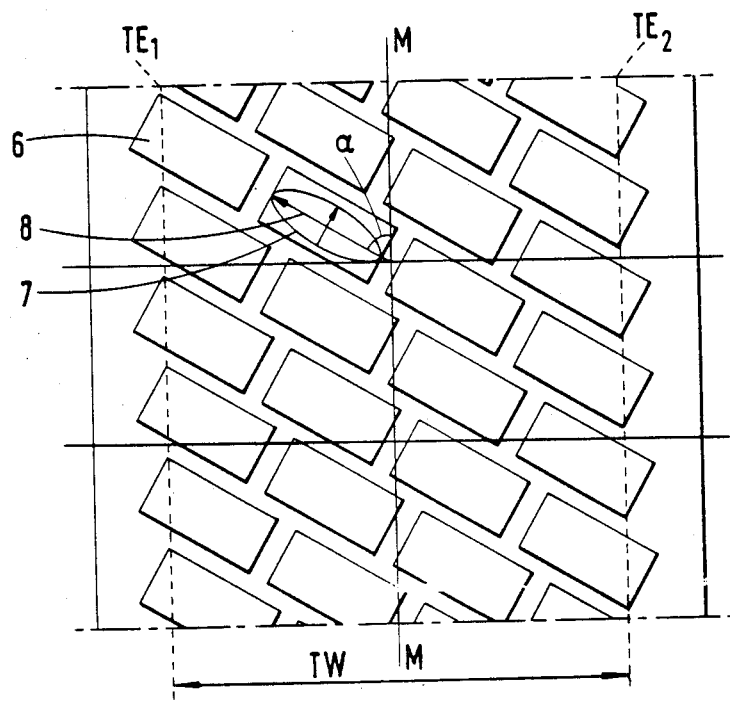
FIG. 2 is a schematic representation of a footprint of a ground engaging tread portion of a tire which can be mounted on the left hand side steering wheel of a vehicle of the present invention.

In FIG. 2 there is shown a schematic representation of a footprint of a ground engaging tread portion of a tire which comprises elongated relief elements 6 as illustrated in FIG. 1, having central ellipses of inertia 7 with the direction of their major axis 8 making an angle $\alpha$ with the mid-circumferential plane M—M of the tire. In the example shown, all the relief elements 6 are identical and oriented in the same direction. Hence the major axes 8 of the central ellipses of inertia 7 of the relief elements 6 make the same angle with the mid-circumferential plane M—M of the tire.

Since the relief elements 6 provide their highest stiffness in a direction, which makes an angle $\alpha$ with the mid-circumferential plane M—M, and since they are all disposed parallel to each other, the entire ground engaging tread portion of the tire provides its highest stiffness in a single direction, which makes an angle $\alpha$ with the mid-circumferential plane M—M.

Figure 3:
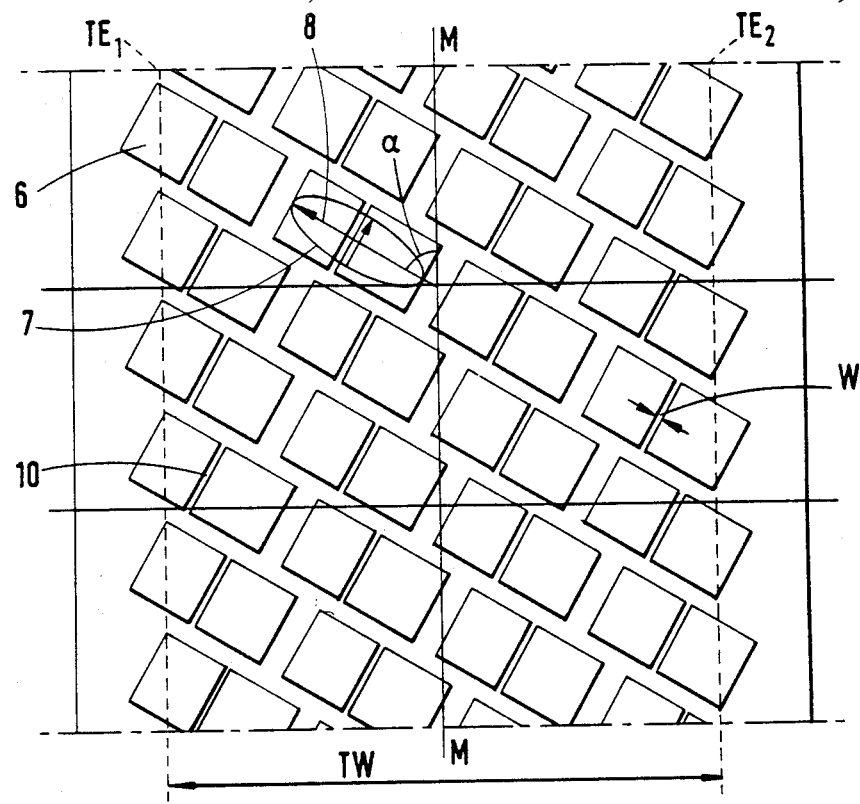
FIG. 3 is a schematic representation of another footprint of a ground engaging tread portion of a tire which can be mounted on the left hand side steering wheel of a vehicle of the present invention.

While the relief elements 6 shown in FIG. 2 consist of continuous blocks uninterrupted by grooves, the invention equally applies to tire treads comprising relief elements 6 comprising juxtaposed individual blocks separated by narrow grooves 10 as shown in FIG. 3. When a tangential cornering force is applied to the ground engaging tread portion of the juxtaposed individual blocks, the narrow grooves close up in the footprint of the tire, with the result that the individual blocks act as single, uninterrupted relief elements and hence as single elongated relief elements as described above. It is generally considered in the tire art that narrow grooves which have a width W that is smaller than 1% of the tread width TW close up in the footprint of the tire. The tread width TW of a ground engaging tread portion being defined as the greatest axial distance between the tread edges $TE_1$, $TE_2$ of the ground engaging tread portion when measured from a footprint of the tire.

A tire having a footprint as shown in FIGS. 2 or 3 is, according to the present invention, suitable for mounting on the steering wheel of the left hand side of a vehicle while a tire having a footprint which is, for example, a mirror image of the footprint as shown in FIGS. 2 or 3, is, according to the present invention, suitable for mounting on the steering wheel of the right hand side of a vehicle.

Figure 4:
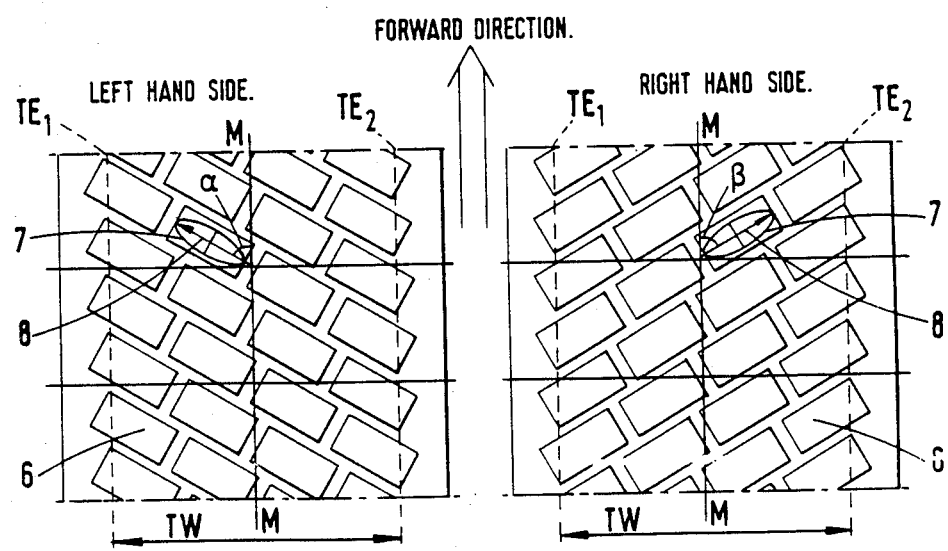
FIG. 4 is a schematic representation of the footprints of a set of tires mounted on the steering wheels of a vehicle according to the invention.

FIG. 4 shows a schematic representation of the footprints of a set of tires, according to the present invention, which can be mounted on the steering wheels of a vehicle, the tire mounted on the left hand side of the vehicle having a footprint as illustrated in FIGS. 2 or 3 and the tire mounted on the right hand side of the vehicle having a footprint which is a mirror image of the footprint as illustrated in FIGS. 2 or 3. The set of tires are mounted on the steering wheels in such a way that the tire which is mounted on the left hand side of the vehicle has a ground engaging tread portion comprising elongated relief elements 6 with the direction of the major axis 8 of their central ellipse of inertia 7 being located in the second and fourth quadrant of their Cartesian axes and making an angle $\alpha$ comprised between 45° and 80° with the mid-circumferential plane M—M of the tire, while the tire which is mounted on the right hand side of the vehicle has a ground engaging tread portion comprising elongated relief elements 6 with the direction of the major axis 8 of their central ellipse of inertia 7 being located in the first and third quadrant of their Cartesian axes and making an angle $\beta$ comprised between 45° and 80° with the mid-circumferential plane M—M of the tire.

In the embodiment shown in FIG. 4, all elongated relief elements 6 have a central ellipse of inertia 7 with the direction of their major axis of inertia 8 making the same angle $\alpha$, $\beta$ with the mid-circumferential plane M—M.

Figure 5:
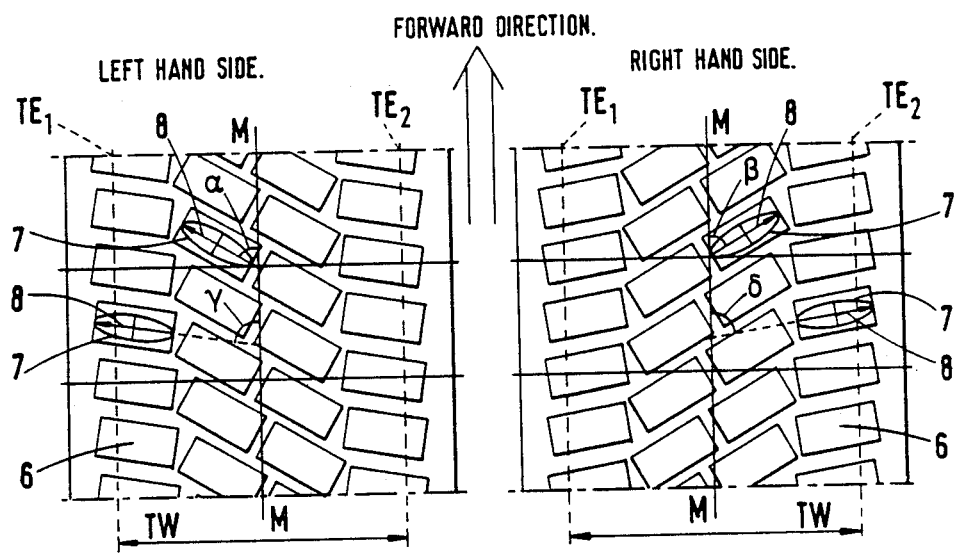
FIG. 5 is a schematic representation of the footprints of a set of tires mounted on the steering wheels of a vehicle according to a preferred embodiment of the invention.

FIG. 5 illustrates a further preferred embodiment of the invention. FIG. 5 shows a schematic representation of the footprints of a set of tires, according to the invention, which can be mounted on the steering wheels of a vehicle, whereby the tread portions of the tires comprise elongated relief elements 6 having central ellipses of inertia 7 with the direction of their major axis 8 making an angle with the mid-circumferential plane M—M which is not constant across the tread width TW but which varies across the tread width TW. Indeed, the angle which the direction of the resultant cornering force makes with the mid-circumferential plane M—M of the tires of the steering wheels of a vehicle is not a constant but changes with such factors as: speed of the cornering vehicle, cornering radius, camber angle, vehicle load etc. It is therefore advantageous to dispose the relief elements in the footprint such that they provide their highest stiffness over a wider range of directions, i.e. to spread the angle $\alpha$ which the direction of the major axis of the central ellipse of inertia of the relief elements makes with the mid-circumferential plane M—M over a wider range. According to the present invention, the angle $\alpha$ is in the range of 45° to 80°.

In a further preferred embodiment of the invention, the central portion of the ground engaging tread portion of the set of tires comprises elongated relief elements 6 which each have a central ellipse of inertia 7 with the direction of their major axis 8 making an angle in the range of 45° to 65° with the mid-circumferential plane M—M, while the shoulder portions of the ground engaging tread portion comprise elongated relief elements 6 which have a central ellipse of inertia 7 with the direction of their major axis 8 making an angle in the range of 60° to 80° with the mid-circumferential plane M—M. By central portion of the ground engaging tread is meant the portion of the tread that extends on either side of the mid-circumferential plane M—M over about 25% of the tread width TW and by shoulder portions are meant the portions on either side of the central portion which extend from the edges of the footprint over about 25% of the tread width TW.

In the example shown in FIG. 5, the elongated relief elements 6 situated in the central portion of the ground engaging tread portions of the set of tires have central ellipses of inertia 7 with the direction of their major axes 5 making angles $\alpha$, $\beta$ of about 60° with the mid-circumferential plane M—M, while the elongated relief elements 6 situated in the shoulder portions of the ground engaging tread portions have central ellipses of inertia 7 with the direction of their major axes 8 making angles $\gamma, \delta$ of about 80° with the mid-circumferential plane M—M.

While the invention has been described with reference to a set of tires comprising a ground engaging tread portion with all the elongated relief elements being oriented in a preferred direction across the entire surface of the ground engaging tread portion, it is sufficient for obtaining the benefits of the present invention that at least more than half the elongated relief elements are oriented in a preferred direction, or expressed differently, that the sum of the ground engaging surfaces of the elongated relief elements in the footprint of the tire is greater than half the total ground engaging surface of the tire.

Figure 6:
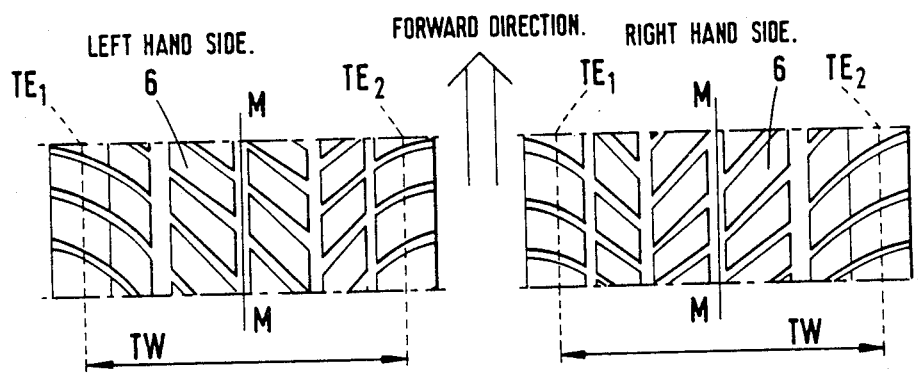
FIG. 6 is a schematic representation of the footprints of a set of tires mounted on the steering wheels of a vehicle according to a further preferred embodiment of the invention.

This is illustrated in the embodiment shown in FIG. 6, in which the set of tires comprise a ground engaging tread portion having elongated relief elements 6 oriented in a preferred direction across 73% of the total ground engaging surface of the tires.

As the portion of the ground engaging tread that is situated between the mid-circumferential plane M—M and the edge $TE_1$, $TE_2$ of the ground engaging tread portion corresponding to the outboard side of the vehicle counteracts the cornering force to a larger extent than the portion of the ground engaging tread that is situated between the mid-circumferential plane M—M and the edge $TE_1$, $TE_2$ of the ground engaging tread portion corresponding to the inboard side of the vehicle, it is preferable according to the present invention that at least the portion of the ground engaging tread that is situated between the mid-circumferential plane M—M and the edge $TE_1$, $TE_2$ of the ground engaging tread portion corresponding to the outboard side of the vehicle comprises elongated relief elements oriented in a preferred direction as described above.

While the present invention has been described with reference to a set of tires for mounting on a vehicle having two steering wheels, the invention is not limited to use with such a vehicle, but equally applies to a set of tires for use with a vehicle having more than two steering wheels.

As in the embodiment shown in FIG. 4, it is preferred that for the embodiments shown in FIG. 5 and FIG. 6, the ground engaging tread portion of the set of tires which is mounted on the left hand side of the vehicle is the mirror image of the ground engaging tread portion of the tire which is mounted on the right hand side of the vehicle.

While the invention provides that at least the steering wheels, e.g. the front wheels of a vehicle, should be equipped with a set of tires according to the invention, it is further preferred that the rear wheels are equally equipped with a set of tires according to the invention. This applies especially to vehicles having a weight distribution such that the main portion of the weight of the vehicle rests on the rear axle of the vehicle. In this case, the rear wheels have to counteract the major part of the cornering force and in particular the outside rear wheel of the cornering vehicle as the load of the vehicle is primarily transferred to this wheel.

The invention is intended to be used on passenger vehicles. By passenger vehicles are meant vehicles that are characterized in that they are equipped with tires comprising a ground engaging tread portion of which the net-to-gross ratio, i.e. the ratio between the surface of the relief elements of the ground engaging tread portion and the total surface of the ground engaging tread portion as measured in the footprint of the tire, is greater than 50%.

I claim:

1. A vehicle comprising at least two steering wheels, each wheel having a pneumatic tire mounted thereon, each said tire having a ground engaging tread portion comprising a plurality of circumferentially extending arrays of substantially rectangular relief elements, as measured in a footprint of each said tire the ratio of the sum of the areas of the ground engaging surfaces of said substantially rectangular shaped relief elements to the total area of the ground engaging surface of said tread portion being greater than 50%, the treads of said tires having structures such that, using Cartesian axes wherein the center of the Cartesian axes of each said substantially rectangular relief element is located at its center of gravity and the x-axis being the axial direction of the tire and the y-axis being the circumferential direction of the tire, in a footprint of a tire mounted on a steering wheel on the left hand side of the vehicle said substantially rectangular shaped relief elements have central ellipses of inertia with the direction of their major axes being located in the second and fourth quadrants of their Cartesian axes and making an angle of between 45° and 80° with respect to the y-axis of said Cartesian axes, and in a footprint of a tire mounted on a steering wheel on the right hand side of the vehicle said substantially rectangular shaped relief elements have central ellipses of inertia with the direction of their major axes being located in the first and third quadrants of their Cartesian axes and making an angle of between 45° and 80° with respect to the y-axis of said Cartesian axes.

2. A vehicle according to claim 1, wherein at least ⅔ of the total surface of the ground engaging tread portion of the tires comprises substantially rectangular relief elements, oriented as claimed in claim 1.

3. A vehicle according to claim 2, wherein at least the portion of the ground engaging tread of each said tire that is situated between a mid-circumferential plane of the tire and the edge of the ground engaging tread portion corresponding to the outboard side of the vehicle comprises substantially rectangular relief elements oriented as claimed in claim 1.

4. A vehicle according to claim 3, wherein the relief elements consist of uninterrupted, continuous blocks.

5. A vehicle according to claim 3, wherein the relief elements consist of juxtaposed individual blocks separated by grooves which have a width smaller than 1% of the tread width.

6. A vehicle according to claim 3, wherein a central portion of the ground engaging tread portion of each tire mounted on a steering wheel comprises substantially rectangular relief elements which have the major axes of their central ellipses of inertia disposed at an angle of between 45 and 65 degrees with respect to the y-axis of the respective Cartesian axes and a portion of the ground engaging portion of each said tire is disposed axially outwardly of said central portion comprises substantially rectangular relief elements which have the major axes of their central ellipses of inertia disposed at an angle of between 60 and 80 degrees with respect to the y-axis of the respective Cartesian axes.

* * * * *